Figure 2:
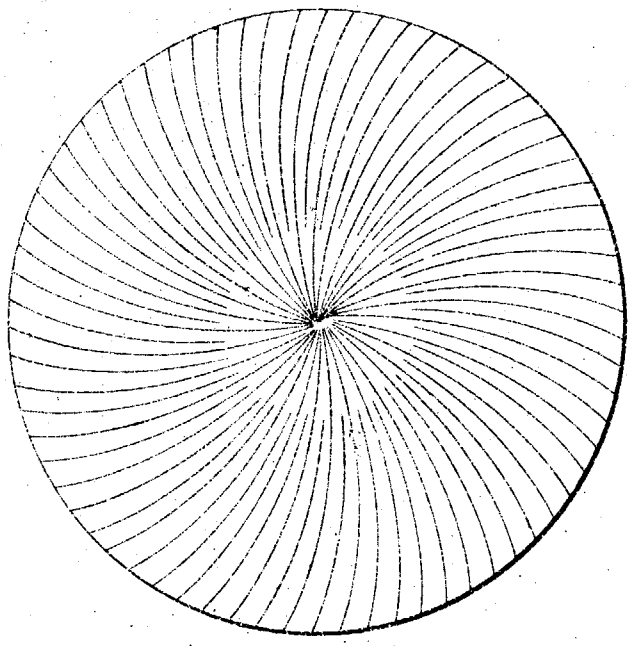
Figure 1:
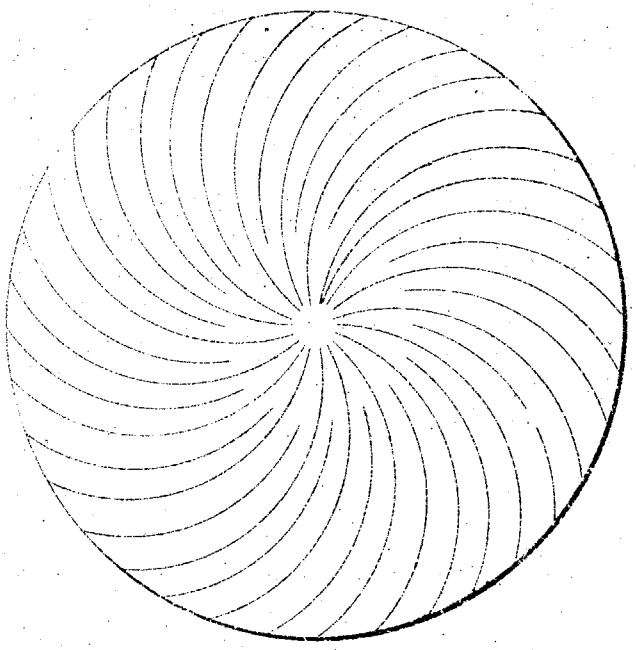

8419X

J. W. Ellmore.

Millstone.

Patented Sept. 25, 1834.

NO PRINTED COPY OF SPECIFICATION IN OFFICE

8419x

Sept 25. 1834 577

Isaac W. Elmore of Lyons New York
Letters Patent

The Schedule referred to in these Letters Patent and making part of the same
containing a description in the words of the said Isaac W Elmore himself, of
his improvement in dressing Mill Stones.

To all whom these presents shall come, Be it known that I Isaac
W Elmore of the Town of Lyons in the County of Wayne and State of New
York have invented a new and useful improvement in the dress of mill
Stones for the manufacture of flour and for grinding any substance or sub-
stances usually ground in mills, and that the following is a full and exact
description of said improvement as invented by me.
1 My improvement consists 1st In giving to the furrows of Mill stones
a greater degree of angle or draught at and near the region of the verge of the stones
in proportion to the degrees of angle or draught near the eye or centre
than has heretofore been used. 2nd In giving to the furrows at and near
the region of the verge, a greater degree of angle or draught than has heretofore
been used or given to the furrows of Mill stones in which the degrees of angle
or draught were equal in the furrows. The amount or degrees of angle or
draught which I claim as part of my improvement or invention may
be determined in the following manner, to wit, By using the segments
of circles of any diameter from seven to that of three feet and also the seg-
ments of circles of all or any intermediate diameter, between those of seven
and of three feet. on a stone the diameter of which is five feet (and in that
proportion for stones of any other diameter) as follows. Place one of the
points of an instrument proper for sweeping or describing circles at or as
near the centre of the stone as you choose (or in other words commencing
with or without draught at the eye) using the other point as a pivot,
and sweep or describe the segment of a circle from thence to the verge, the
radius or sweep used must be in proportional length to the diameter of the stones to
which it is applied in the ratio above claimed. Altho I have used the circle
and segments of circles to convey a knowledge of the principles of my improvement
yet I do not consider myself bound or confined to the use of them to obtain the Drawing 8419x Sept 25, 1834 required draught of the furrows. Therefore any other form or shape of furrows than than those produced by the use of the circles or segments thereof having the relative amount of draught or degrees of angle. I also claim as part of my improvement the degrees of angle or amount of draught produced by the segment of a circle whose diameter is seven feet is the least or smallest; and the segments of a circle whose diameter is three feet will produce the greatest amount or ratio of draught when applied to a stone of five feet in diameter in the manner before described. and the same ratio or relative amount of draught is claimed for mill stones of all or any other diameter as my improvement.

Some of the objects to be attained by the use of my improvement in dress. will be better understood by stating some of the difficulties attendant on the principal modes of dress now in use. 1st The quarter dress which is the one now in general use, is one in which the furrows have an unequal draught. to wit some furrows have more draught than others. consequently the grinding can not be performed in an even and uniform manner. For if those furrows. which have the greatest draught do not force the meal out from under the stone until the process of grinding is finished it is evident that those furrows of less draught will not force it out until a portion of the meal or flour is injured. Another objection is, that there is too great a draught given to the furrows at and near the eye of the stone in proportion to the draught at and near the verge there by forcing the grain while in a coarse state towards the verge making it necessary to use more weight consequently requiring more power to perform the operation of grinding than would be necessary if a greater share of the work was performed near the eye, and also generating a greater degree of heat than is proper for the benefit of flour. 2nd Those modes of dress now in use, in which the furrows have an equal draught. grind too slow, because the furrows have so little draught on the region of the verge of the stone that they cannot discharge the meal as soon as it is sufficiently ground in consequence of which the edges of the furrows and other cutting parts of the stone are continually encumbered with flour or meal which ought to be discharged, thereby preventing the stone from cutting free and clear by reason of which the grain is reduced to flour more by pressure and less by cutting than it should be, (this will also apply to the quarter dress) rendering it clammy and heavy, in 8419x Sept 25, 1834 which state it will not bolt free, neither will it rise so well in baking.
My improvement is intended to obviate these difficulties 1st By equalizing
the draught in all the furrows it obviates the difficulty which for want of
that equality is inseparable from the use of the quarter dress.
2d By giving to the furrows a less proportion of draught near the eye
the stones are enabled to perform a greater portion of grinding in that region
where less power is required to perform the work, than near the verge.
3d By constantly increasing the draught in the furrows as they approach
the verge in a greater ratio than has heretofore been used thereby enabling
them to overcome the increasing difficulty of forcing the meal onward as it
increases in fineness (which the accelerated motion of the verge of the stone
with the modes of dress heretofore used is not sufficient to perform)
thereby discharging the meal as soon as it is sufficiently ground leaving the
furrows and other cutting parts of the stone unincumbered by reason of
which the grinding will be done with less pressure and less power, and con-
sequently less heat will be generated in the operation, the meal being cooler
and more even will bolt more freely and the flour will be less liable to sour.
This improvement is calculated to take the best possible advantage of the
power to be applied to all sizes and velocities of stones, to wit, the seven feet
circle commencing the furrows at or near the centre, is best for stone that run
with considerable velocity, not having sufficient power to bear a heavy
feed. And as the draught of the furrows are increased by lessening the
circle so the feed must be increased, and an additional power will be requi-
red. (It is believed from the experiments already made that a five feet
stone having the furrows on a circle of five feet commencing two or three inch
es from the centre is capable of doing the greatest amount of grinding (it must
be observed however that the experiments were made on the wheat grown in
the western part of this State, which wheat is more tender than that in the
Eastern part, and much more so than that in the Southern States. It will
be necessary therefore to make a proportionate allowance according to the quality
of the wheat to be ground, to wit. the harder the wheat is to grind, the longer
it will require to be under the stones, consequently a less draught in the fur
rows will be necessary). Experiments have been made on nearly all the larger 8419x Sept 25, 1834 to six inches less than the size of the stone: this last the furrows were put
in from the centre and it is found to require less power for the operation
of grinding in proportion as the draught is less at the eye; it also requires
a slower motion than those on a larger circle. The smallest circle gives
the greatest draught on the verge of the stone; and the intention is to make the
draught of the furrows at and on the region of the eye small as may be there-
by enabling the stone to perform all the grinding possible in that quarter, and
the draught being great on the verge is calculated to make it do less in that region
and in proportion as it does more at the eye and less of the grinding at
and near the verge of the stone, the less power it will require to perform the
operation and is calculated for a slow motion. It will therefore be applica-
ble to mills when there is a want of power. The number of furrows ne-
cessary for stones, must in some measure depend on their qualities. say
for a five feet from thirty four to forty as the case may require. from one
to one and a quarter ^[inch] inch ^[in width] running every other one into the eye (those may
be denominated leading furrows. those between running to a point near the
eye (being careful not to run up so far as to cut up the face of the stone
too much) leaving the lands at the point between the leading furrows.
nearly as wide as those on the verge. But this ought also to depend some on
the quality of the eye blocks. For laying out the furrows get out the furrow
sticks of the dimensions wanted in such a manner as to fasten it at the cen-
tre of the stone so as to turn it round. The stone being divided off on the
verge for the required number of furrows, proceed to lay out every other one run-
ning them into the eye Then lay out the others only running them up from
the verge say one third of the way to the eye; then place the front edge of the furrow
stick where you left off on the back line, draw a line from thence in towards the
eye & the back part of the furrow will be finished, then place the back edge on
the front line &c. this will bring the furrow to a point; as to the depth necessary
for furrows. care should be had that the depth and width should be in pro-
portion so that the rise from the bottom and back part of the furrow be
gradual and easy of ascent. care should also be had that the stones have a good face
all the way to the eye. In testimony whereof I have ^[this day] hereunto set my hand
August 19th 1834

Witnesses. { Hepburt Ford
William M. Elmore

Isaac W. Elmore (1950 words)

(Granted September 25. 1834)